F. A. REECE.
LIQUID CENTRIFUGAL SEPARATING MACHINE.
APPLICATION FILED FEB. 8, 1915.

1,230,601.

Patented June 19, 1917.
2 SHEETS—SHEET 2.

WITNESSES:

INVENTOR

UNITED STATES PATENT OFFICE.

FRANKLIN A. REECE, OF HOPKINTON, MASSACHUSETTS.

LIQUID CENTRIFUGAL SEPARATING-MACHINE.

1,230,601. Specification of Letters Patent. Patented June 19, 1917.

Application filed February 8, 1915. Serial No. 6,917.

*To all whom it may concern:*

Be it known that I, FRANKLIN A. REECE, a citizen of the United States, residing in Hopkinton, in the county of Worcester and State of Massachusetts, have invented a new and useful Liquid Centrifugal Separating-Machine, of which the following description, in connection with the accompanying drawings, is a specification, like characters on the drawings representing like parts.

My invention relates to centrifugal liquid separators, especially such as are used for separating cream from milk.

An object hereof is to afford a separating machine of improved structure and better efficiency and convenience. A particular object is to give more uniform results, namely to deliver cream of constant butter fat content notwithstanding variations within reasonable limits of the quality of the milk or the speed of rotation. Further objects and advantages will be explained hereinafter or will be apparent to those skilled in the art.

To the attainment of such objects and advantages the present invention consists in the novel separator, and its novel mode of operation and features of combination and arrangement herein described, illustrated or claimed. In general the improvement operates by providing a positive rotation of the liquid to be centrifugally separated, and a means whereby one of the separated liquids controls the size or capacity of the liquid outlets, which in turn controls the relative specific gravity proportion of the separated liquids.

Figure 1:
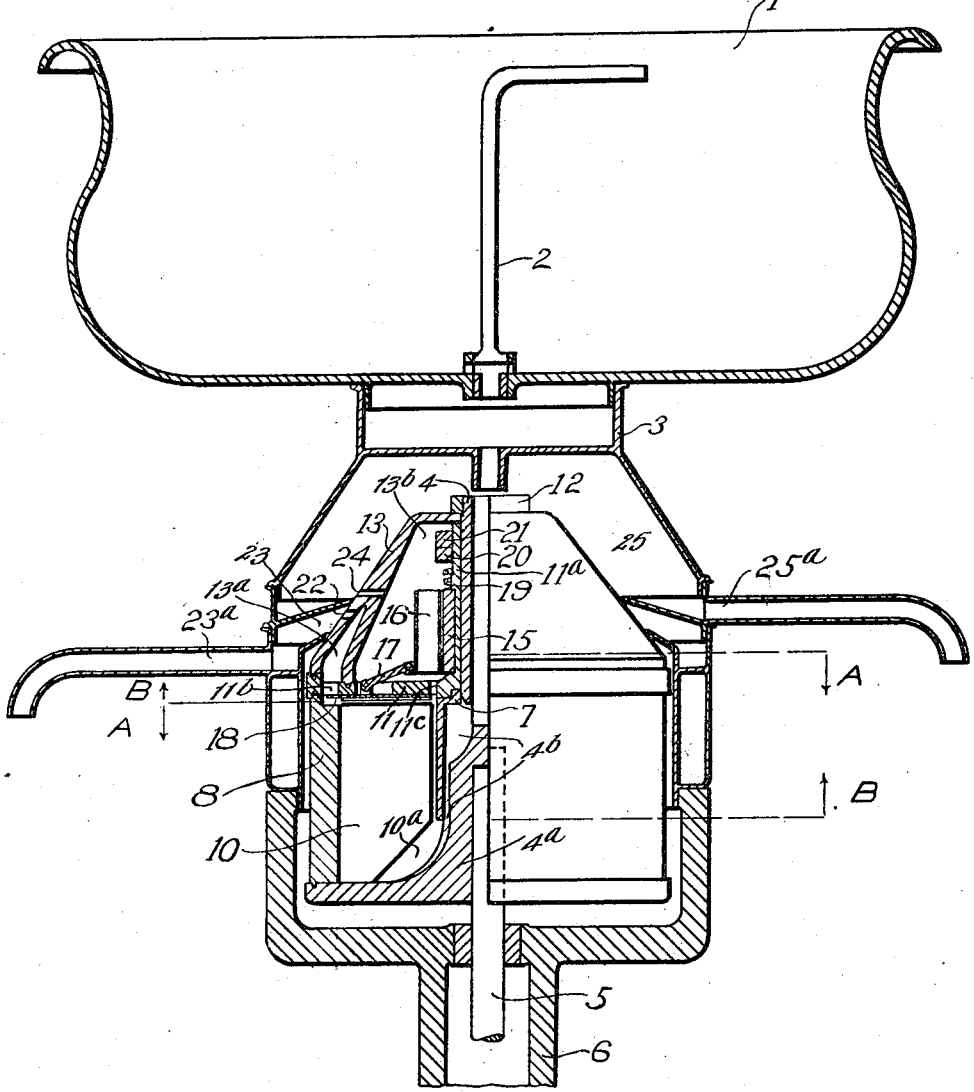
Figure 2:
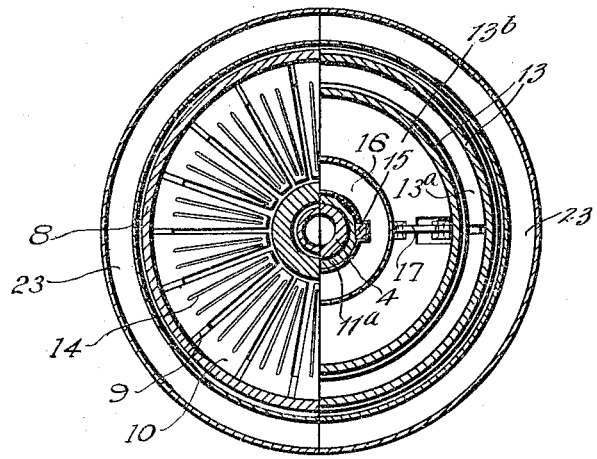
Figure 3:
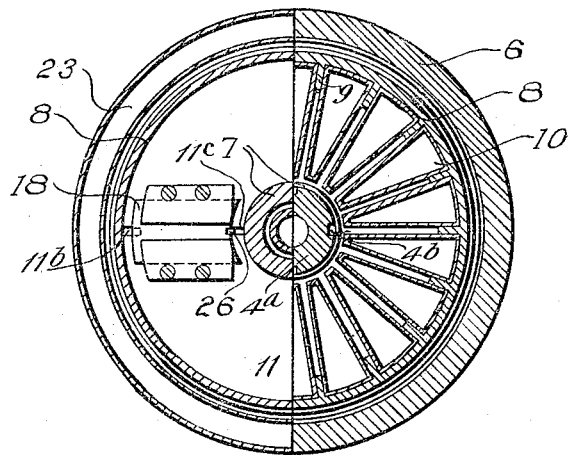

Referring to the drawings, Figure 1 is a central section of a separator embodying my invention with half of the rotating vessel shown in elevation. Fig. 2 is a horizontal section on the line A—A of Fig. 1, and Fig. 3 is a similar section on the line B—B of Fig. 1.

I have shown a removable supply bowl or funnel 1 to receive the liquid to be separated, with a valve and handle 2 for controlling the liquid flow into a chamber 3 just below formed at the top of the main casing. From here the liquid flows through central outlet into the central tube 4 which is rotated by a spindle 5 having its upper bearing in the stationary frame or casting 6 of the machine. Any means of rotating the shaft at high speed may be employed, such as a worm and worm-wheel or spiral gearing.

The liquid in the rotating tube 4 passes out from the bottom of its hollow interior through four narrow lateral slots in the sides thereof. The tube is integral with the rotating base $4^a$ of the separating vessel and the base is grooved with four grooves $4^b$ as seen in Figs. 1 and 3, which grooves at the top of the base $4^a$ penetrate the tube 4 forming the slots mentioned, and extend downwardly therefrom to lead the liquid into the separating chamber of the vessel. The upper parts of the grooves are inclosed by the snugly fitting sleeve 7.

The separating vessel consists of the vertical annular wall 8 inclosed between the base $4^a$ below and the upper parts hereafter to be described.

I will now describe a means, inside the rotating vessel, for causing a positive rotation of the liquid in thin layers. This is done by interiorly forming the separating vessel with compartments directed centrifugally or radially and each so arranged that the liquid, as it separates in the compartments or layers, may flow axially or upward toward the outlets.

Inside the wall 8 are formed small partitions 9 that retain and hold apart a series of eighteen pieces 10 of sector shape, each of which extends from the bottom nearly to the top of the chamber and is cut away on the lower inside corner thus leaving a small annular space $10^a$ for receiving the liquid from the grooves $4^b$.

The sectors 10 may be hollow for lightness as seen in Fig. 3, and being slightly spaced apart by ribs 9, there are formed radially extending passages by which the liquid may rise, flowing to the top of the vessel.

The positive rotation caused by this arrangement facilitates the separation of the heavier liquid portions, which pass to the periphery, from the lighter parts which rise in proximity to the sleeve 7.

Above the vessel wall 8 and sectors 10 is a flat disk 11 which covers the separating vessel and is integral with a tubular sleeve $11^a$ surrounding the central tube 4. This disk is pressed down by the round nut 12, which is threaded on the tube 4 and also holds down the cone-shaped cover piece 13. Between the piece 13 and the disk 11, and between the disk 11 and the ring 8, and between the ring 8 and the base $4^a$ are rubber gaskets to insure tight joints.

The cone piece 13 has a double wall, as seen in Fig. 1, forming annular chambers 13ª and 13ᵇ for the heavy and light liquid portions, respectively, and discharging into proper spouts.

In the disk 11 are two openings at each side, one 11ᵇ at the periphery for the heavier liquid to pass upward into the outer chamber 13ª of the part 13, and the other 11ᶜ at the inside for the lighter liquid to pass to the inside chamber 13ᵇ.

As the liquid supplied to the bottom of the vessel separates and rises, passing above the sectors 10, its separated constituents constantly pass through the openings 11ᵇ and 11ᶜ respectively. Above the sectors is a small space, wherein to insure that the liquid continues its positive rotation, I have provided narrow fins 14 projecting from the top of the sectors very nearly into contact with the bottom of the disk 11.

I will now describe means whereby the separated liquid, by its character or specific gravity, may control the outlets so as to regulate their action and secure uniformity of separation.

The sleeve 11ª carries opposite keys 15 arranged vertically and serving as guides to permit sliding and cause rotation of a float 16. This float at each side is connected by a link 17 to a radially sliding valve piece 18 snugly fitted between the sectors 10 and disk 11. The link is nearly horizontal so that centrifugal force on the valve and link are negligible. The float is pressed downward against its tendency to float and rise in the liquid by a spring 19 whose tension is adjusted by a nut 20 and a lock-nut 21. The sliding valves 18 bear such relation to the passages 11ᵇ and 11ᶜ in disk 11 as to change the relative sizes thereof, increasing that for the heavier liquid when decreasing that for the lighter liquid and vice versa, as controlled by the float 16.

The heavier and lighter parts of the liquid rise through apertures 11ᵇ and 11ᶜ into their respective chambers 13ª and 13ᵇ in the part 13. Exits 22 from chamber 13ª conduct the heavier liquid into the annular chamber 23, formed in the non-rotating part of the apparatus, and discharging into spout 23ª. The lighter liquid passes from chamber 13ᵇ through outlets 24 into chamber 25 having spout 25ª.

As the lighter liquid rises and fills chamber 13ᵇ it causes the float 16 to rise somewhat against the tension of the spring 19. When the milk runs uniform the adjustment will be constant, but variations will cause automatic readjustment. Thus, suppose the cream should be issuing in too heavy a condition. This heavier liquid will tend to further raise the float, causing the slide 18 to move radially inward to open the outlets 11ᵇ a little more for the heavier liquid and to close somewhat the outlets 11ᶜ for the lighter liquid. This not only reduces the quantity of lighter liquid, but, closing the outlet 11ᶜ at its outer side, tends to cause a still lighter quality of cream to flow into the inner chamber 13ᵇ of the part 13. If too light, the liquid will not have such a buoyant effect upon the float 16 and the spring 19 will consequently depress the float 16 slightly and cause the lighter liquid outlets to open more. This action thus maintains a balance, and the specific gravity of the lighter liquid is thus regulatable by the tension of the spring 19. To insure against an entire closure of the lighter liquid outlets I have provided a small nick 26 in each sliding valve 18.

Regulation is easily effected by increasing the tension of spring 19 if less butter fat content in the cream is desired. When set, the results are very constant. Even speed changes are ineffective to materially change the action, since any change in the lighter part of the liquid reacts upon the float, which restores the desired conditions.

While I have herein illustrated the details of one embodiment of my invention, various changes may obviously be made without departing from my invention, and the claims are not intended to be limited excepting so far as limitations are recited therein.

Having fully described my invention, what I claim as new and desire to secure by Letters Patent is:

1. A centrifugal liquid separator including in combination a rotary separating vessel, outlet passages for the respective separated portions of the liquid, and means controlled by the character of the liquid in one of said outlet passages adapted to regulate the relative sizes of the respective outlets.

2. A centrifugal liquid separator including in combination a rotary separating vessel, outlet passages for the respective separated portions of the liquid, and means controlled by the specific gravity of the liquid in one of said outlet passages for regulating the relative specific gravities of the respective outflowing liquids.

3. A centrifugal liquid separator including in combination a rotary separating vessel, outlet passages for the respective separated portions of the liquid, and a float device controlled by the specific gravity of the liquid in one of said outlet passages for regulating the relative specific gravities of the respective outflowing liquids.

4. A centrifugal liquid separator including in combination a rotary separating vessel, outlet passages for the respective separated portions of the liquid, and a float operated valve device whereby the specific gravity of the liquid in one of said outlet passages controls the relative proportion of the respective outlets.

5. A centrifugal liquid separator including in combination a rotary separating vessel, interiorly formed with centrifugally directed narrow compartments each so arranged that the liquid as it separates therein may flow in thin layers axially toward the vessel outlets, outlet passages for the respective separated portions of the liquid, and means controlled by the character of the liquid in one of said outlet passages adapted to regulate the relative specific gravities of the respective outflowing liquids.

6. A centrifugal liquid separator including in combination a rotary separating vessel, adapted to rotate about a vertical axis, centrally arranged inlet passages leading from above to the bottom of the vessel, and members within the vessel dividing it into a plurality of narrow radial compartments in which the liquid may rise in thin layers as it separates, outlets for the separated portions of the liquid, outlet passages for the respective separated portions of the liquid, and means controlled by the character of the liquid in one of said outlet passages adapted to regulate the relative specific gravities of the respective outflowing liquids.

7. A centrifugal liquid separator including in combination a rotary separating vessel, interiorly formed with centrifugally directed compartments each so arranged that the liquid as it separates therein may flow axially toward the vessel outlets, outlet passages for the respective separated portions of the liquid, and a float operated valve device whereby the specific gravity of the liquid in one of said outlet passages controls the relative proportion of the respective outlets.

8. A centrifugal liquid separator including in combination a rotary separating vessel, interiorly formed with centrifugally directed narrow compartments each so arranged that the liquid as it separates therein may flow in thin layers axially toward the vessel outlets, outlet passages for the respective separated portions of the liquid, a spring opposed device controlled by the specific gravity of the liquid in one of said outlet passages for regulating the relative specific gravities of the respective outflowing liquids, and means to adjust said device at will for altering the specific gravity proportion.

FRANKLIN A. REECE.

Witnesses:
EMMA D. BROOKS,
M. TERESA REECE.

Copies of this patent may be obtained for five cents each, by addressing the "Commissioner of Patents, Washington, D. C."